United States Patent [19]

Brooks

[11] Patent Number: 5,195,563
[45] Date of Patent: Mar. 23, 1993

[54] FLEXIBLE HOSE AND FITTINGS

[75] Inventor: David A. Brooks, Transvaal, South Africa

[73] Assignee: Oakleigh Limited c/o Havelet Trust Company International Limited, St Peter Port, Channel Islands

[21] Appl. No.: 818,291

[22] Filed: Jan. 9, 1992

Related U.S. Application Data

[62] Division of Ser. No. 271,539, Nov. 15, 1988, abandoned.

[51] Int. Cl.$^5$ .................... F16L 57/00; E04H 3/20
[52] U.S. Cl. .................... 138/103; 138/106; 138/109; 138/110; 138/121; 138/178; 15/1.7; 4/490
[58] Field of Search ............ 138/103, 110, 121, 178, 138/109; 285/7, 903, 921; 405/171; 15/1.7; 4/490; 134/167 R

[56] References Cited

U.S. PATENT DOCUMENTS

| 2,650,113 | 8/1953 | Brace | 285/7 |
| 3,332,093 | 7/1967 | Skinner et al. | 138/103 |
| 3,727,949 | 4/1973 | Kleykamp et al. | 285/7 |
| 3,838,713 | 10/1974 | Tubbs | 138/109 |
| 4,558,889 | 12/1985 | Gans | 285/7 |
| 4,651,377 | 3/1987 | Staples | 134/167 R |
| 4,839,063 | 6/1989 | Brooks | 134/167 R |
| 4,909,547 | 3/1990 | Guy | 285/903 |
| 5,042,844 | 8/1991 | Iida et al. | 285/921 |

Primary Examiner—James E. Bryant, III
Attorney, Agent, or Firm—Kelly, Bauersfeld & Lowry

[57] ABSTRACT

A flexible hose has ribbed portions concatenated with cylindrical smooth portions. The ribbed portions provide flexibility and resilience to the hose. Flotation cuffs for buoyancy and wheel cage cuffs for reducing friction are mounted on selected smooth portons of the hose. A fitting removeably attaches to a ribbed portion forming the end of the hose to allow rotatable attachment of the hose to other apparatus.

11 Claims, 3 Drawing Sheets

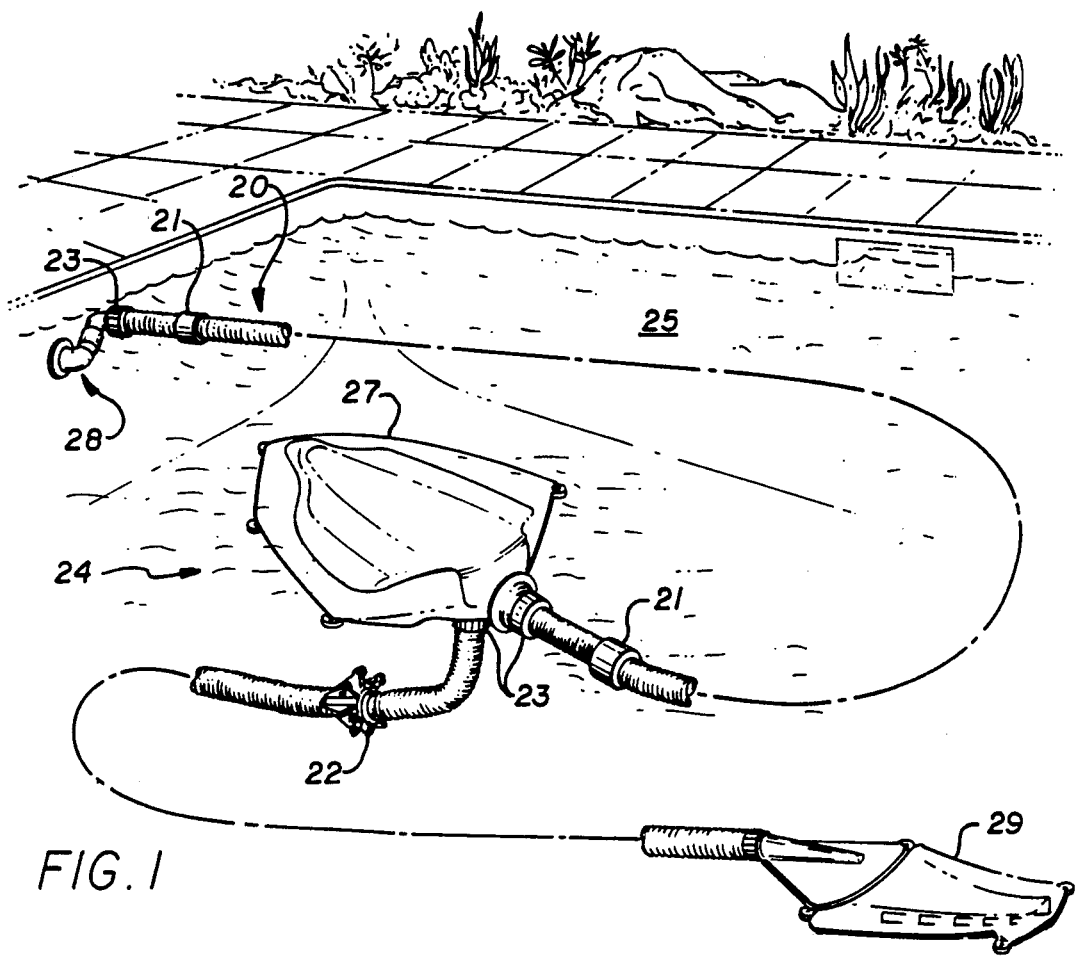
FIG. 1
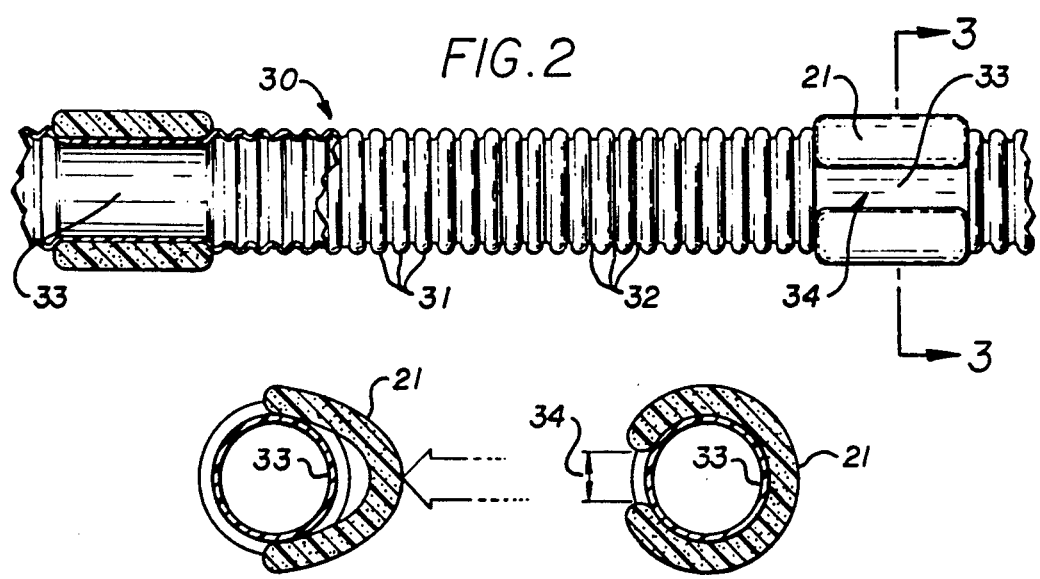
FIG. 2
FIG. 3A    FIG. 3B

FLEXIBLE HOSE AND FITTINGS

This is a divisional of copending application Ser. No. 07/271,539 filed on Nov. 15, 1988 now abandoned.

BACKGROUND OF THE INVENTION

This invention relates to hoses for swimming pool cleaners and the like, and specifically to a hose having simple fittings to cause the hose to float, to assist the hose in moving across the pool bottom, or to attach the hose to other pool equipment.

Numerous types of cleaning devices have been developed for swimming pools. Typical swimming pool cleaners are connected to the filtration system of the pool by a long, flexible hose. Some pool cleaners include a surface unit connected by flexible hoses to both the filter outlet and to an underwater cleaning head. One such mechanism is disclosed in U.S. Pat. No. 4,652,366.

The hoses used in pool cleaners may be composed of various materials. Plastic is popular because of relatively low cost, flexibility and durability. An advantageous base construction is a thin-walled plastic tube formed as a series of alternating ribs and grooves giving the hose wall strength while preserving the ability to flex and bend.

As can be seen in the above-identified patent, various fittings are attached to the hose used in a swimming pool cleaner. Among these are end couplings that typically have been threaded, adhesively secured or sealed to the hose, and accessories mounted on the hose, such as floats and wheeled attachments for rolling along the walls of the pool.

SUMMARY OF THE INVENTION

The present invention provides a simplified hose construction that simply and inexpensively accommodates a variety of hose attachments and facilitates both the manufacture of the attachments and the assembly of the attachments on the hose. To these ends, the hose comprises a plurality of ribbed portions that alternate with and are joined together by relatively short smooth portions. The ribbed portions provide the desired flexibility and a novel mounting feature for end fittings. The smooth portions provide mounting areas for attachments such as flotation cuffs or wheel cages that are fitted around the hose.

More specifically, in the preferred embodiment of the invention, the ribbed portions are relatively long, constituting most of the length of the hose, and the smooth portions are relatively short, having approximately the length of the attachments so that the ribs on opposite sides of an attachment will form stops for holding the attachment in place on the hose. The attachments include generally cylindrical body portions that are divided longitudinally along one side to form a slot that is narrower than the outside diameter of the smooth portions. The slot permits assembly of the attachment by flexing of the hose, or of the attachment, or of both, after which the resilience of one or both of the parts restores the parts to their normal shapes with the attachment assembled on the hose.

Flotation cuffs for use in the present invention are made of buoyant material and preferably are resiliently flexible for installation on the hose. Wheel cages for use on the invention have bodies that are made of resiliently flexible plastic, preferably non-buoyant, and have outwardly projecting fins that are arranged in pairs around the periphery of the cuff. Each pair of fins defines a slot for a wheel. One of the fins in each pair carries an axle pin that projects across the slot to support a wheel in the slot. The plastic of the cuff and the fins is sufficiently flexible to permit spreading of the fins or insertion of a wheel, and the resilience of the plastic thereafter holds the wheels rotatably in place between the fins.

The end fitting of the invention makes use of the ribbed configuration and flexibility of the thin-walled hose to provide a very simple, but effective, coupling between the hose and the fitting. For this purpose, the fitting is formed with an internal opening for receiving the ribbed portion of the hose with a close fit, and has an internal abutment for engaging with a groove behind one of the ribs, preferably the first full rib at the end of the hose. The internal abutment interlocks with the adjacent hose rib to couple the fitting to the hose.

The flexibility of the hose permits it to be collapsed for insertion into the fitting and then expanded into interlocked relation with the fitting. The parts may be sized to make the connection fairly loose for a swivel action when the hose is not under pressure. With thin-walled plastic, the pressure of water inside the hose causes the hose to expand into tight engagement with the fitting when the hose is delivering water to a pool cleaner.

BRIEF DESCRIPTION OF THE DRAWINGS

Other features and advantages of the invention will be apparent from the following Detailed Description taken in conjunction with the accompanying drawings, in which:

FIG. 1 is a perspective view of a pool cleaner having a flexible hose incorporating various aspects of the present invention, certain parts being removed for simplicity of illustration;

FIG. 2 is an enlarged side elevational view of the flexible hose of FIG. 1, partly broken away and shown in cross-section, with a flotation cuff attached;

FIGS. 3A and 3B are sectional views of the hose taken along the line 3—3 of FIG. 2 showing the method of attachment of the flotation cuff to the hose;

DETAILED DESCRIPTION

Figure 4:
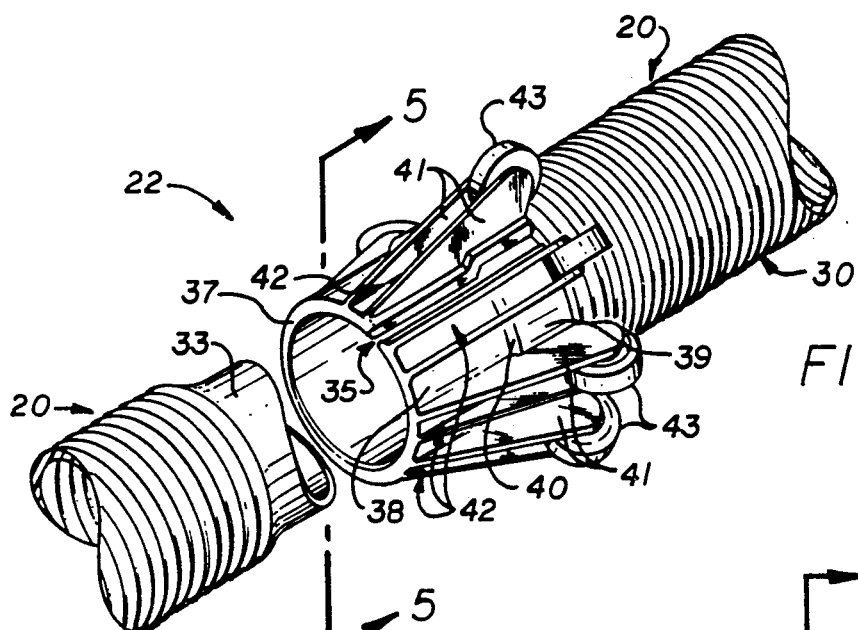
FIG. 4 is an enlarged fragmentary perspective view of a wheel cage attached to the hose according to the present invention.

As shown in the drawings, the present invention is embodied in a hose 20 and attachments 21, 22 and 23 that are incorporated in an illustrative pool cleaner 24 in a swimming pool 25. The pool cleaner is of the type having a surface unit 27 that is connected by an upper, floating section of the hose to an outlet 28 in the wall of the swimming pool to receive water under pressure from the filtration system of the pool, and a subsurface cleaning head 29 that is connected to the surface unit 27 by a lower, non-floating section of the hose. The pool cleaner is shown herein for purposes of illustration, and does not constitute a part of the invention.

In accordance with the present invention, the hose 20 is of flexible thin-walled tubular construction and has a plurality of elongated portions 30 which comprise a series of ribs 31 that alternate with grooves 32, forming most of the length of the hose. The ribbed portions are joined together by relatively short smooth portions 33 of smaller outside diameter providing mounting areas for attachments such as flotation cuffs, shown at 21 on the floating section of the hose, wheel cages, shown at 22 on the lower section of the hose, and fittings, shown at 23 attaching the hose to the surface unit 27, outlet 28 and cleaning head 29. The hose is made of a hard, durable plastic and so ribbed portions are necessary to provide flexibility and resilience to the hose. The cylindrical sections are not significantly resilient and do not contribute to the flexibility of the hose.

The flotation cuffs, the wheel cages and the fittings have generally cylindrical bodies. The flotation cuffs and wheel cages each have longitudinal slots 34 and 35 to allow radial expansion of the hollow cylindrical bodies and insertion of a smooth portion of the hose into the bodies. When the expansion is relaxed, the cylindrical bodies contract into loosely-assembled relation with the smooth portion of the hose. The longitudinal slots in both the flotation cuff and the wheel cage are narrower than the diameter of the smooth portion of the hose and so the attached cuff and cage do not detach from the hose.

As shown in FIG. 1, a plurality of flotation cuffs are attached to the second portions along the length of the floating hose. The flotation cuffs are made of a buoyant material such as foamed polypropylene. As depicted in FIGS. 2 and 3, the length of the flotation cuffs 21 is about the same as, or slightly less than, the length of the smooth portions 33 of the hose 20. As shown in FIGS. 3A and 3B, the longitudinal slot 34 along the length of the flotation cuff permits radial expansion of the flotation cuff and insertion of a smooth portion of the hose into the hollow core of the flotation cuff. The longitudinal slot 34 is then released and contracts around the smooth portion of the hose. Each of the flotation cuffs is thereby attached to the hose to provide buoyancy to that portion of the hose.

The hose 20 extending between the surface unit 27 and cleaning head 29 sinks so that the cleaning head can move about the bottom of the swimming pool 25 and disrupt the settling of dirt and debris. Because the submerged hose is often dragged across the bottom of the pool, the smooth portions of the submerged hose are used to attach the wheel cages 22 to the hose. The wheel cages help reduce the friction between the hose and the pool bottom.

Figure 6:
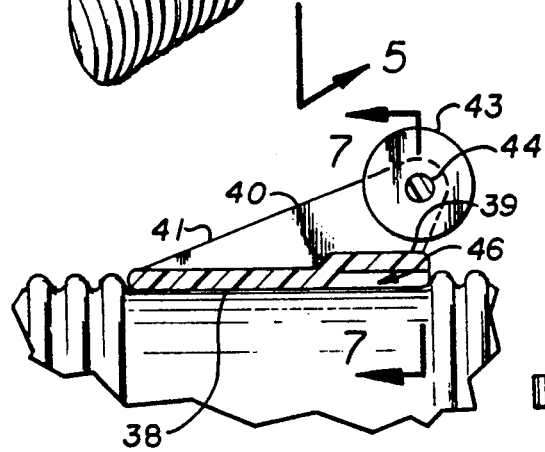
FIG. 6 is a fragmentary sectional view of the wheel cage taken along the line 6—6 of FIG. 5.
Figure 5:
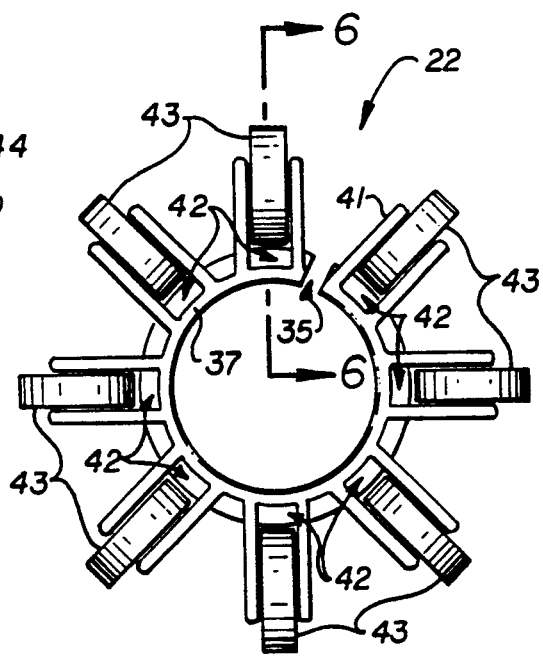
FIG. 5 is an enlarged end view of the wheel cage taken along the line 5—5 of FIG. 4.

As shown in FIGS. 4 and 5, the wheel cage 22 has a hollow cylindrical body 37. The longitudinal slots 35 permit radial expansion of the wheel cage and insertion of a smooth portion 33 of the hose into the body of the wheel cage. The length of each wheel cage is about the same as, or slightly less than, the length of the smooth portions of the hose. As shown in FIG. 6, each wheel cage has a first diameter on the forward end 38 and a second, slightly greater diameter on the other trailing end 39. A short step 40 connects the forward end and the trailing end. The step and the greater diameter of the trailing end of the wheel cage cause a small circular gap 46 between the trailing end and the smooth portion of the hose. This gap provides space for a weight (not shown) for the hose.

A plurality of radially outwardly directed fins 41 are formed around the circumference of the body 37 of each wheel cage 21. Each fin perpendicularly extends from the cylindrical body along the longitudinal length of the wheel cage. The fins are arranged in pairs and each pair forms a slot 42 for mounting wheels 43 around the wheel cage.

Figure 7:
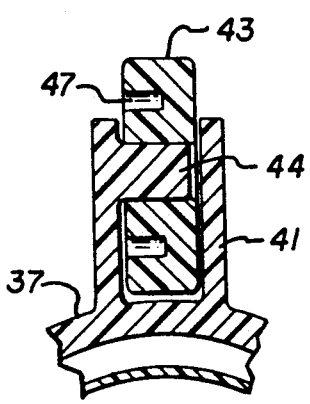
FIG. 7 is a further enlarged sectional view of a wheel mounted in the wheel cage taken along the line 7—7 of FIG. 6.
Figure 8:
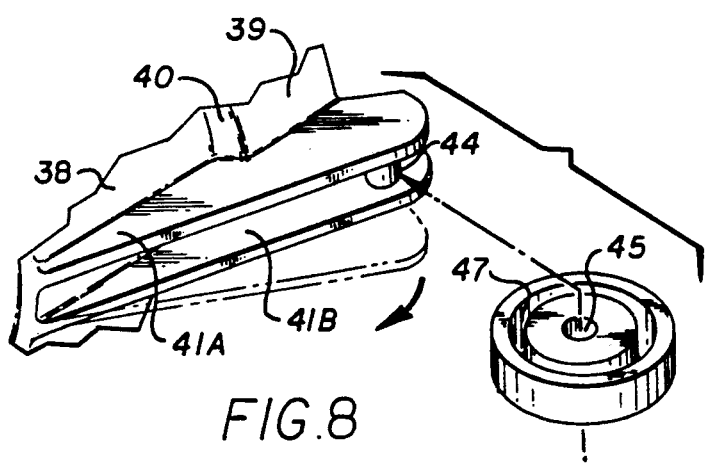
FIG. 8 is a fragmentary perspective view of a portion of the wheel cage of FIG. 4 showing the method of attaching the wheel to the wheel cage.
Figure 9:
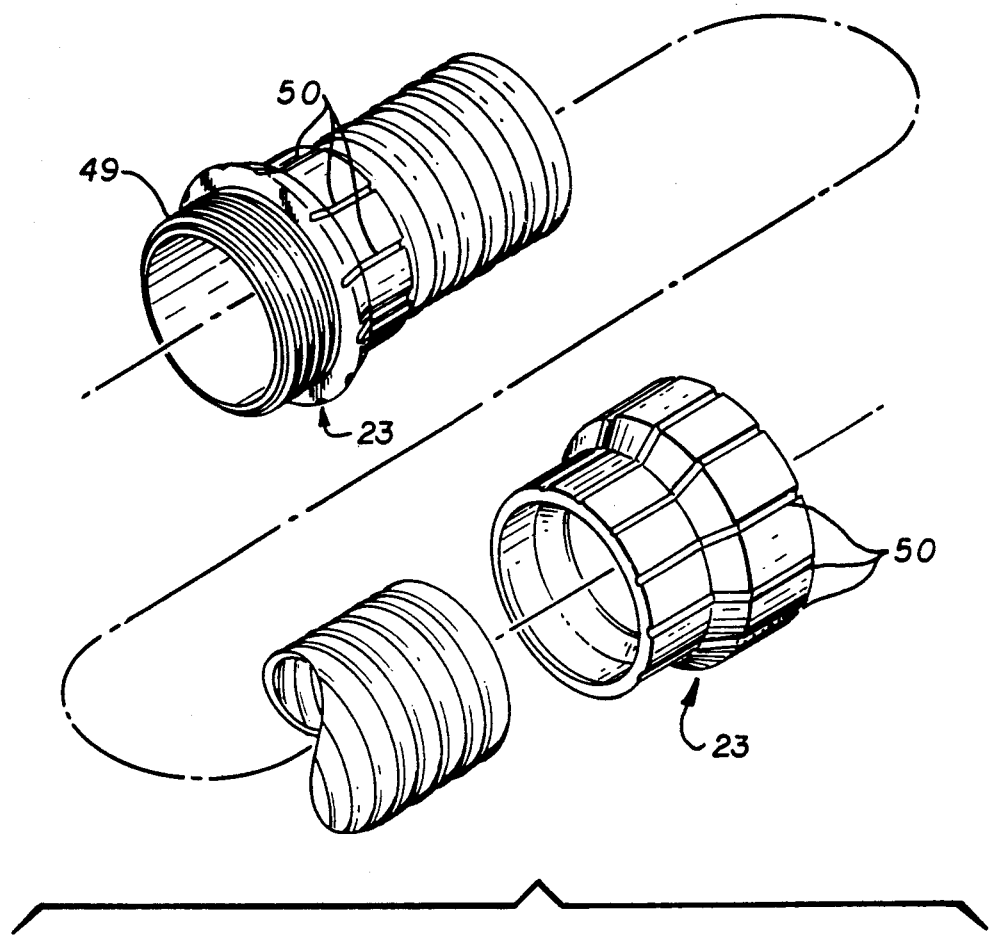
FIG. 9 is an exploded perspective view of the hose and end fittings of the present invention.

As shown in FIG. 8, an axle 44 formed on one fin 41A of each pair of fins extends toward the second fin 41B in the pair. To mount the wheel in a slot the fins are pried apart and the wheel mounted on the axle. As shown in FIGS. 6 and 7, the axle rotatably holds the wheel in the slot.

Each wheel 43 is disc-shaped with a central aperture 45 into which the axle 44 is inserted. The wheels also have an optional circular groove 47 extending around one side.

As shown in FIG. 4, a plurality of wheels 43 are mounted around the circumference of each wheel cage 22. When the pool cleaner 24 is activated, the submerged hose 20 is dragged across the pool bottom by the cleaning head 29. The wheels contact the bottom of the pool 25 and rotate, thereby reducing the friction between the hose and the pool bottom.

As depicted in FIG. 6, each fin 41 forms an incline relative to the cylindrical body 37 of the wheel cage 21 so that each fin has a greater height on the trailing end 39 of the wheel cage than on the forward end 38. The wheels 43 are mounted on the trailing end of the fin. Should the pool bottom contact a fin as the cleaning head pulls the hose, the incline draws the pool bottom into contact with the associated wheel and lifts the hose and wheel cage above contact with the pool bottom, leaving only the wheel in contact with the pool bottom. The wheel then rotates to reduce the friction between the hose and pool bottom.

As shown in FIG. 1, the fittings 23 may be used to attach the ends of the hoses 20 to the pump outlet 28, surface unit 27 or cleaning head apparatus 29. Each fitting includes either a male or a female threadable engagement end 49 to attach the fitting to the desired apparatus. A plurality of grooves 50 around the circumference of the fitting assist the user in grasping and turning the fitting to engage the fitting to a threaded coupling such as the pump outlet in a wet, swimming pool environment.

Figure 10:
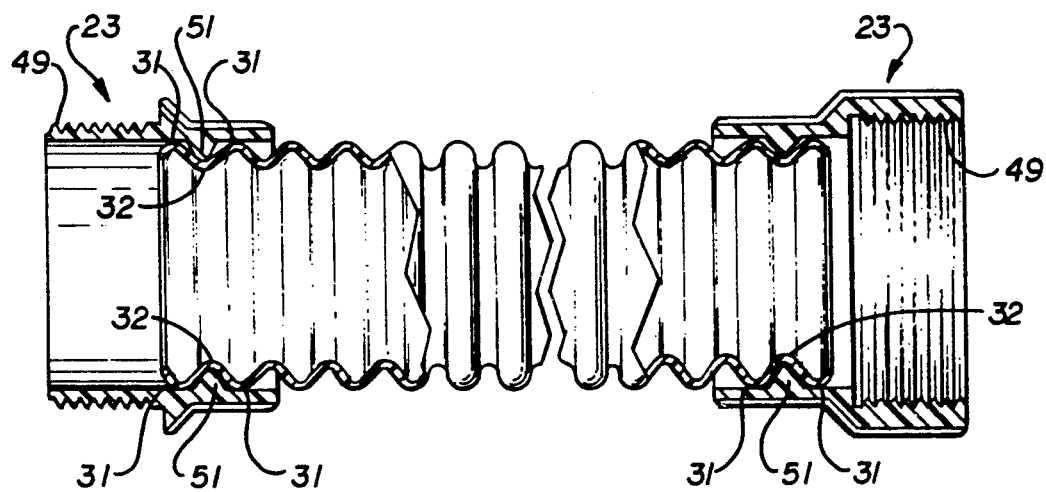
FIG. 10 is a side-elevational view of the hose and end fittings of FIG. 9, with the fittings shown in cross-section.

Each fitting 23 can be rotatably and removeably attached to a ribbed portion of the hose 23. Specifically, to attach the hose to the fitting, the hose is cut so that a ribbed portion forms the end of the hose. Each fitting has an internal abutment 51 around the interior circumference of the fitting. The hose is attached to the fitting by collapsing the hose wall and inserting the end of the hose into the fitting so that the abutment is aligned with the groove 32 between two ribs 31 on the end of the hose as shown in FIG. 10. The hose wall is then expanded and the abutment and end rib engage to prevent detachment of the hose from the fitting under normal operating parameters. To detach the hose from the fitting when the hose is not in use, the wall of the hose is collapsed and the hose pulled out of the fitting.

When in use, water pressure within the hose exerts pressure against the rib 31 and internal abutment 51 and thereby prevents the hose 20 from detaching from the fitting 23. When not in use, however, the fitting may rotate about the hose. Therefore, the fitting may be threaded, for instance, to the outlet 28 or without causing kinks in the hose.

As is apparent from the above description, in operation the pump forces water through the hose 20. The water pressure causes the fittings 23 tightly to grip the hose. The flotation cuffs 21 cause the hose to float. The wheel cages 22 and the associated wheels 43 mounted therein reduce the friction between the hose and the pool walls and hence the cleaning head 29 can cover more area with less expenditure of energy.

The present invention permits inexpensive manufacturing and simple use of a flexible hose both in a floating environment and in an environment in which the hose moves across a rough surface. The hose is easily and removeably connected to a fitting and yet when in use the fitting is securely attached the hose. Each of the various parts of the present invention can be inexpensively made of different plastics through the various techniques known in the art. Each is also very durable and simple to use. Therefore, the novice pool owner can make effective use of the present invention. These and other advantages of the present invention will be evident to those of skill in the art.

I claim:

1. For use in a swimming pool, a hose assembly comprising:
    an elongated resiliently flexible hose having alternating relatively long ribbed portions and relatively short smooth portions with respect to each other along the longitudinal length thereof, each of the ribbed portions comprising a series of alternating ribs and grooves extending around the circumference of the hose and each of the smooth portions having an outer diameter substantially smaller than the outer diameter of the ribs of the ribbed portions;
    at least one attachment removeably mounted on said hose around one of said smooth portions in a position longitudinally between an adjacent pair of said ribbed portions, said attachment having a generally hollow cylindrical body having a length no longer than the length of said one of said smooth portions and being divided longitudinally along one side to form a slot extending the full length of the body, said body having an inside diameter smaller than the outer diameter of the ribs of said adjacent pair of said ribbed portions so that the ribs of said adjacent pair of ribbed portions longitudinally retain the attachment on the hose about said one of said smooth portions, said body being composed of resiliently flexible material to permit opening of said slot for assembly of the attachment on the hose; and said body being a non-buoyant sleeve having a plurality of outwardly projecting fin members each having a wheel rotatably mounted thereon.

2. The hose assembly of claim 1 wherein each of the fin members comprise a pair of fins in closely spaced relation, one fin of each pair having an axle pin with the wheel mounted thereon.

3. The hose assembly of claim 1 wherein each fin member defines an outer surface forming an incline relative to the cylindrical body.

4. For use in a swimming pool, a hose assembly comprising:
    an elongated resiliently flexible hose having alternating relatively long ribbed portions and relatively short smooth portions with respect to each other along the longitudinal length thereof, each of the ribbed portions comprising a series of alternating ribs and grooves extending around the circumference of the hose and each of the smooth portions having an outer diameter substantially smaller than the outer diameter of the ribs of the ribbed portions;
    at least one attachment removeably mounted on said hose around one of said smooth portions in a position longitudinally between an adjacent pair of said ribbed portions, said attachment having a generally hollow cylindrical body having a length no longer than the length of said one of said smooth portions and being divided longitudinally along one side to form a slot extending the full length of the body, said body having an inside diameter smaller than the outer diameter of the ribs of said adjacent pair of said ribbed portions so that the ribs of said adjacent pair of ribbed portions longitudinally retain the attachment on the hose about said one of said smooth portions, said body being composed of resiliently flexible material to permit opening of said slot for assembly of the attachment on the hose; and
    the attachment forming a wheel cage having a first inside diameter on the first longitudinal end, a second smaller inside diameter on the second longitudinal end, and a short step zone between the first and second longitudinal ends, said wheel cage further comprising means for attaching a plurality of wheels on the wheel cage.

5. The hose assembly of claim 4 further comprising at least one wheel mounted on an axle pin.

6. For use in a swimming pool, a hose assembly comprising:
    an elongated hose composed of resiliently flexible material, said hose having alternating, relatively long ribbed portions and relatively short smooth portions with respect to each other along the longitudinal length thereof and having a ribbed portion at one end, each of the ribbed portions comprising a series of alternating ribs and grooves extending around the circumference of the hose and each of the smooth portions having an outer diameter substantially smaller than the outer diameter of the ribs of the ribbed portions;
    a fitting mounted on said one end of said hose, said fitting having an opening for receiving said one end and at least one of said ribs with a close fit, and internal abutment means on said fitting in said opening for extending into a groove alongside one of said ribs and interlocking with the rib, said hose being insertable in said opening in collapsed condition and expandable into interlocked relation with said abutment means; and
    at least one attachment removeably mounted on said hose around one of said smooth portions in a position longitudinally between an adjacent pair of said ribbed portions, said attachment having a generally hollow cylindrical body having a length no longer than the length of said one of said smooth portions, and said attachment being divided longitudinally along one side to form a slot extending the full length of the body, said body having an inside diameter smaller than the outer diameter of the ribs of said adjacent pair of said ribbed portions so that the ribs of said adjacent pair of ribbed portions longitudinally retain the attachment on the hose about said one of said smooth portions and being composed of said resiliently flexible material to permit opening of said slot for assembly of the attachment on the hose.

7. The hose assembly of claim 6 wherein said body is a sleeve of buoyant material forming a float for said hose.

8. The hose assembly of claim 6 wherein said body is a non-buoyant sleeve and has a plurality of outwardly projecting fin members each having a wheel rotatably mounted thereon.

9. The hose assembly of claim 8 wherein each fin member comprises a pair of fins in closely spaced relation, one fin of each pair having an axle pin with the wheel mounted thereon.

10. The hose assembly of claim 6 wherein the attachment forms a wheel cage having a first inside diameter on the first longitudinal end, a second smaller inside diameter on the second longitudinal end, and a short step zone between the first and second longitudinal ends, said wheel cage further comprising a means for attaching a plurality of wheels on the wheel cage.

11. The hose assembly of claim 10 further comprising at least one wheel mounted on an axle pin.

* * * * *